(12) United States Patent
Botti et al.

(10) Patent No.: US 6,307,357 B1
(45) Date of Patent: Oct. 23, 2001

(54) DIRECT CURRENT STEP-UP CIRCUIT FOR USE WITH BATTERY POWERED EQUIPMENT

(75) Inventors: Edoardo Botti, Vigevano-Pavia; Fabrizio Cassani, Cornaredo-Milan, both of (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/502,079

(22) Filed: Feb. 10, 2000

(30) Foreign Application Priority Data

Apr. 19, 1999 (IT) .............................................. MI99A0257

(51) Int. Cl.[7] ...................................................... G05F 1/46

(52) U.S. Cl. .......................................... 323/282; 330/297

(58) Field of Search .................................. 323/282, 351; 363/16, 124; 330/297

(56) References Cited

U.S. PATENT DOCUMENTS

| 5,350,994 | * | 9/1994 | Kinoshita et al. | ...................... 320/15 |
| 5,825,248 | * | 10/1998 | Ozawa | ................................. 330/267 |
| 5,847,550 | * | 12/1998 | Schie et al. | .......................... 323/222 |

* cited by examiner

Primary Examiner—Jessica Han

(57) ABSTRACT

The step-up circuit has first and second input terminals for connection to a battery, first and second output terminals for connection to an electronic device to be fed by a DC/DC converter having a first and second input terminals connected respectively to the first and second input terminals of the step-up circuit. The second output terminal of the step-up circuit is connected to the second input terminal of the step-up circuit, one output terminal of the converter is connected to the first input terminal of the step-up circuit and the other output terminal of the converter is linked to the first output terminal of the step-up circuit, therefore, when operating, the output of the step-up circuit is the sum of the power of the battery and of the output of the converter. The step-up circuit is smaller, supplies the same output, is cheaper to produce and offers improved performance over the prior art.

35 Claims, 6 Drawing Sheets

DIRECT CURRENT STEP-UP CIRCUIT FOR USE WITH BATTERY POWERED EQUIPMENT

FIELD OF THE INVENTION

The present invention relates to battery powered devices, and, more particularly to a direct current step-up circuit for a battery powered device.

BACKGROUND OF THE INVENTION

One of the factors which affects the commercial success of mass produced battery powered equipment, such as car radios and portable tape recorders, is the output. The output depends, apart from the electrical characteristics of the equipment, on the input. For example, in the case of a multichannel audio amplifier for a car radio, given the number of channels, the conformation of the final stages and the impedance of the speakers, the only way to increase the output is to increase the input. The input is, on the other hand, determined, in the case of the car radio, by the power of the battery of the vehicle and, in the case of portable equipment, by the number and the capacity of the batteries, which in turn is determined on the basis of the acceptable weight and bulk.

DC/DC converters capable of converting incoming direct current into a higher level of outgoing direct current (step-up DC-DC converter) are commonly used in order to increase output. One application of a converter of this type on an amplifier is shown in FIG. 1. A direct current power supply 10, for example a car battery having a current of 14 V between the positive and negative terminals when the vehicle generator is working, is fitted to a voltage step-up circuit 8, including a DC/DC converter 11 capable of supplying 18 V direct current. Note that, in the case of a car radio system, the change from 14 V to 18 V is advantageous since it is possible to obtain a significant increase in output (around 60%) using audio amplifiers built in an integrated circuit using standard technology. If power above 20 V is required it would be necessary to use special integrated technologies for the amplifiers with considerably higher production costs.

The output of the converter 11, which is also the output of the step-up circuit, is applied to an audio frequency amplifier system 12, for example of the 4 channel type in which each channel includes two coupled 30 W amplifiers. A circuit, which senses the output with a voltage divider Rf1 and Rf2 and stabilizes it, is included in the step-up circuit 8.

The distribution of the power in a system of the type described above, with a 14 V battery and a converter 11 sized in order to allow output of 18 V, is shown in FIG. 2. As can be seen, in order to have an output of 60 W per channel it is necessary to have a DC/DC converter 11 of 300 W, i.e. a large circuit with components capable of operating at high power levels and therefore relatively expensive. As has been shown, the power dissipated—Pdiss—by a converter of this kind is typically around 30 W. The power dissipated by the amplifier 12 has the same value.

SUMMARY OF THE INVENTION

An object of the present invention is to provide a direct current step-up circuit suitable for use in systems of the type described above that is smaller in size, more economical to run and which offers improved performance while requiring the same input.

This object is attained by providing a defined step-up circuit step-up circuit having first and second input terminals for connection to a battery, first and second output terminals for connection to an electronic device to be fed by a DC/DC converter having a first and second input terminals connected respectively to the first and second input terminals of the step-up circuit. The second output terminal of the step-up circuit is connected to the second input terminal of the step-up circuit, one output terminal of the converter is connected to the first input terminal of the step-up circuit and the other output terminal of the converter is linked to the first output terminal of the step-up circuit, therefore, when operating, the output of the step-up circuit is the sum of the power of the battery and of the output of the converter. The step-up circuit is smaller, supplies the same output, is cheaper to produce and offers improved performance over the prior art.

BRIEF DESCRIPTION OF THE DRAWINGS

The invention will be better understood following a detailed description of a non-limiting example embodiment, also shown in the enclosed drawings in which.

DETAILED DESCRIPTION OF THE PREFERRED EMBODIMENTS

Figure 1:
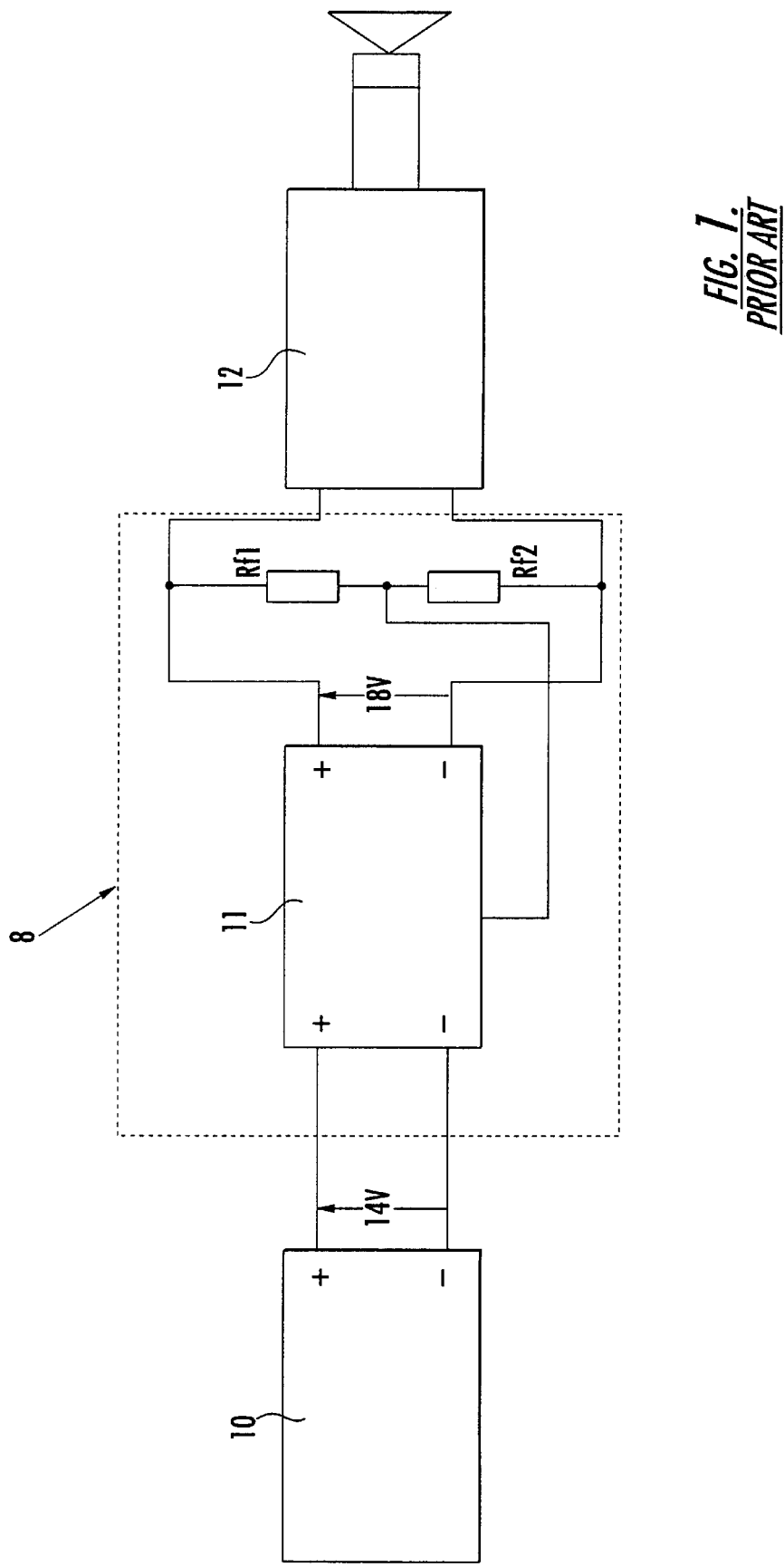
FIG. 1 is a block diagram of a prior art audio frequency amplifier system.
Figure 2:
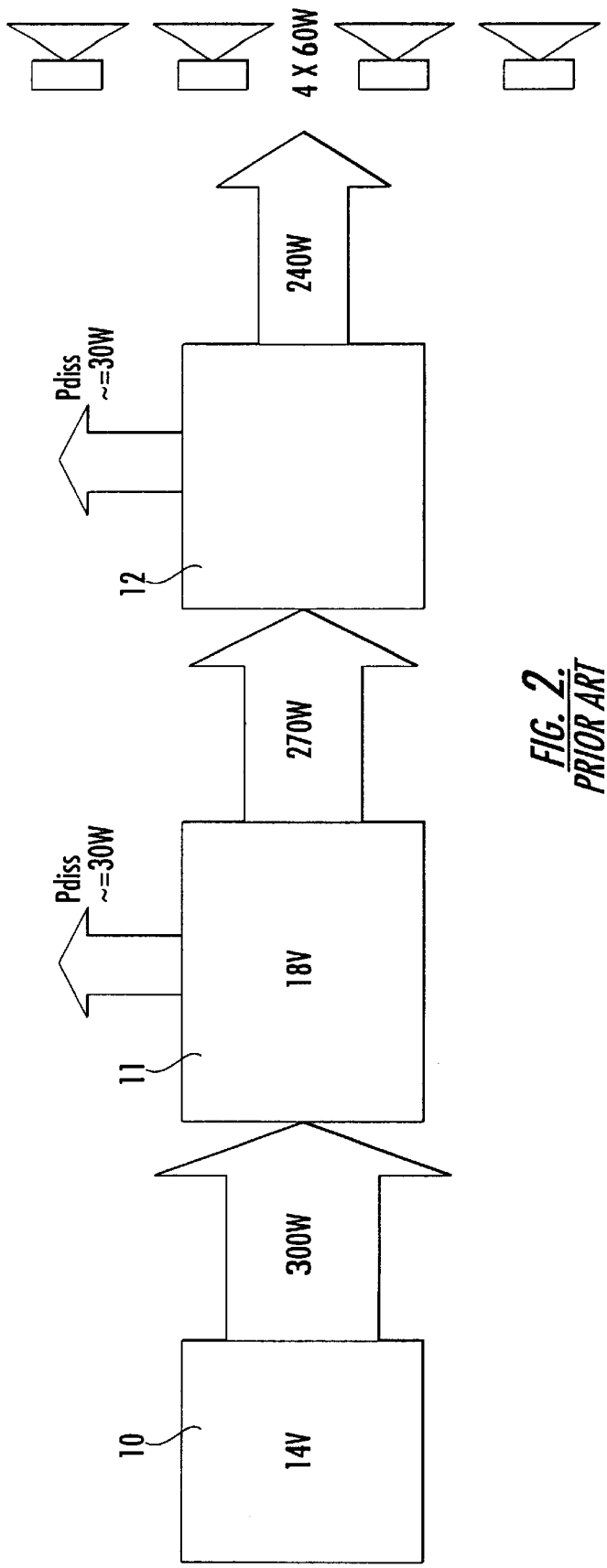
FIG. 2 is a diagram showing the distribution of power in the system in FIG. 1.
Figure 3:
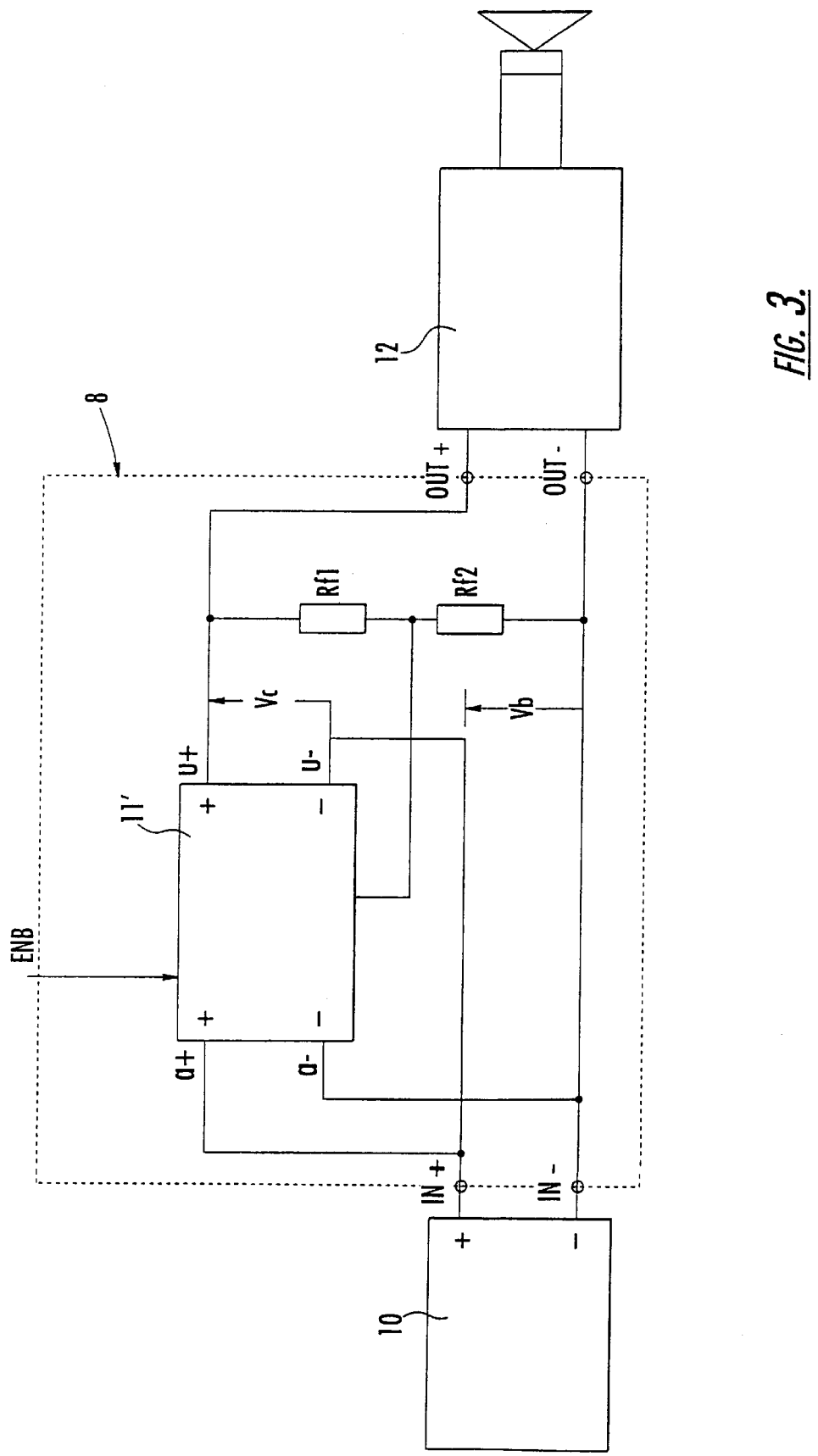
FIG. 3 is a block diagram of an audio frequency amplifier system which uses a voltage step-up circuit according to the present invention.

Referring to FIG. 3, where elements identical to those in FIG. 1 are shown by the same reference numbers or symbols, a DC/DC converter 11' has input terminals a+ and a− connected to the input terminals in+ and in− of the step-up circuit 8, that is connected to the battery 10, as in the known system, but the output is connected differently. In particular, the lower power output terminal, indicated by u−, is connected to the input terminal of the step-up circuit 8 with higher power, shown by in+, and the output terminal with higher power, shown by u+, is connected to the output terminal out+of the step-up circuit, and therefore to an input terminal of the audio amplifier 12.

Moreover, the input terminal in− of the stepup circuit 8 connected to the lower voltage terminal of the battery is connected directly to the other output terminal out− of the step-up circuit, which is connected to the other input terminal of the amplifier 12. With this circuit structure, the output of the step-up circuit 8 is the sum of the input, i.e. the power of the battery, Vb, and the output, Vc, of the converter. In this embodiment the converter 11' is a step-down converter, but the same circuit can be built with a step-up converter if the input needs to be at least double the power of the battery.

According to an advantageous embodiment of the invention, the converter 11' has an ENB terminal and a connector or means (not shown in FIG. 3) for connecting the input terminal a+ to the output terminal u+ in response to a signal on terminal ENB which deactivates the converter.

Figure 4:
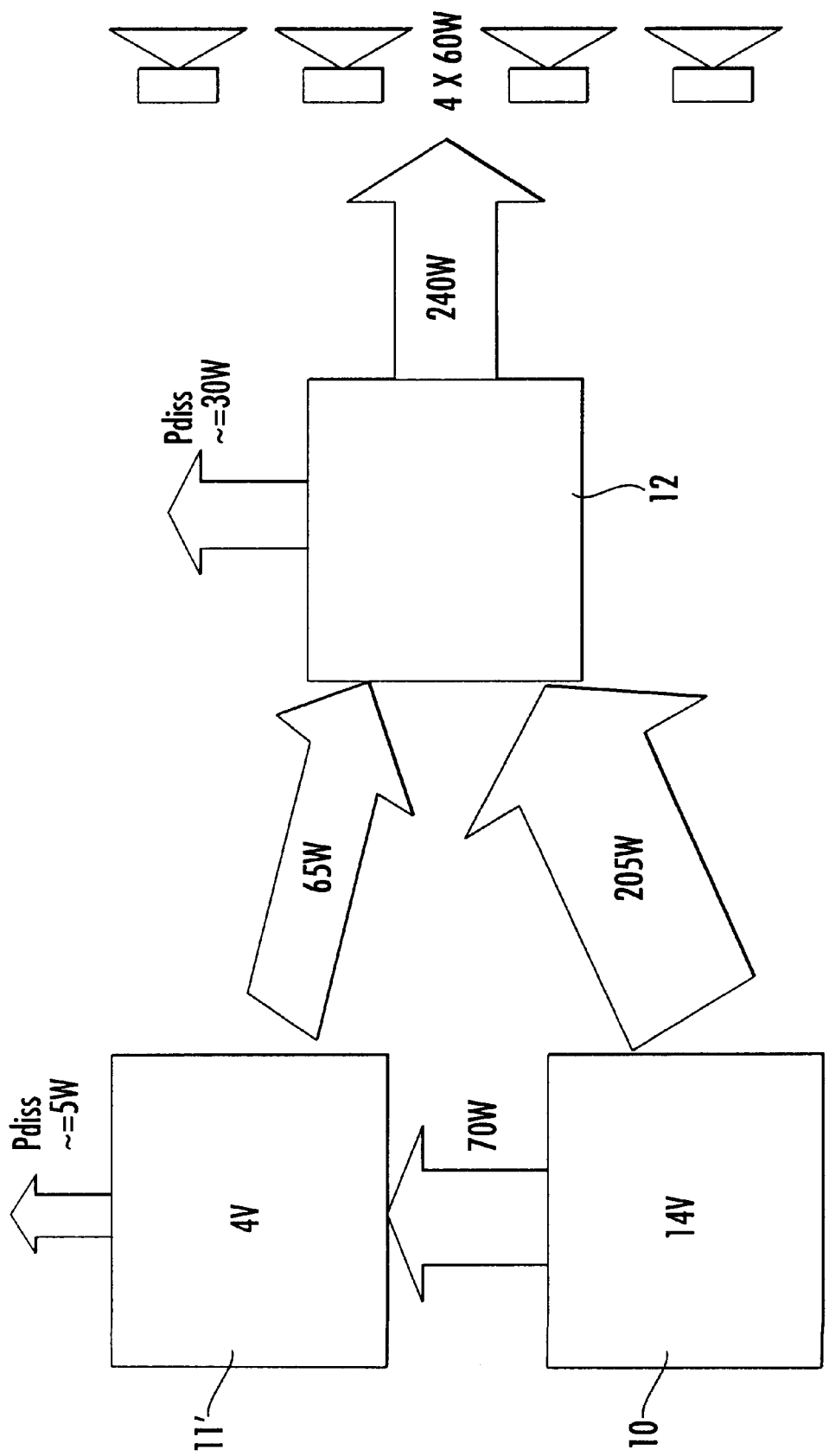
FIG. 4 is a diagram showing the distribution of power in the system in FIG. 3.

Referring to FIG. 4, if the battery output is 14 V and the input to the amplifier is 18 V, in order to attain output of 4×60 W using the same audio amplifier 12 in the system according to the known technique, it is sufficient to use a DC/DC converter 11' with output of 4 V capable of delivering 70 W power. The power is supplied to the amplifier 12 partly directly by the battery 10 (205 W) and partly by the converter (65 W). The power dissipated by the converter 11' is not usually above 5 W.

The advantages that derive from the use of the step-up circuit according to the invention should be clear to the skilled artisan. Indeed, equal audio frequency output can be obtained using a less powerful DC/DC converter than the known technique. This leads to lower overall power dissipation and increased performance, smaller size and less expensive components.

Figure 5:
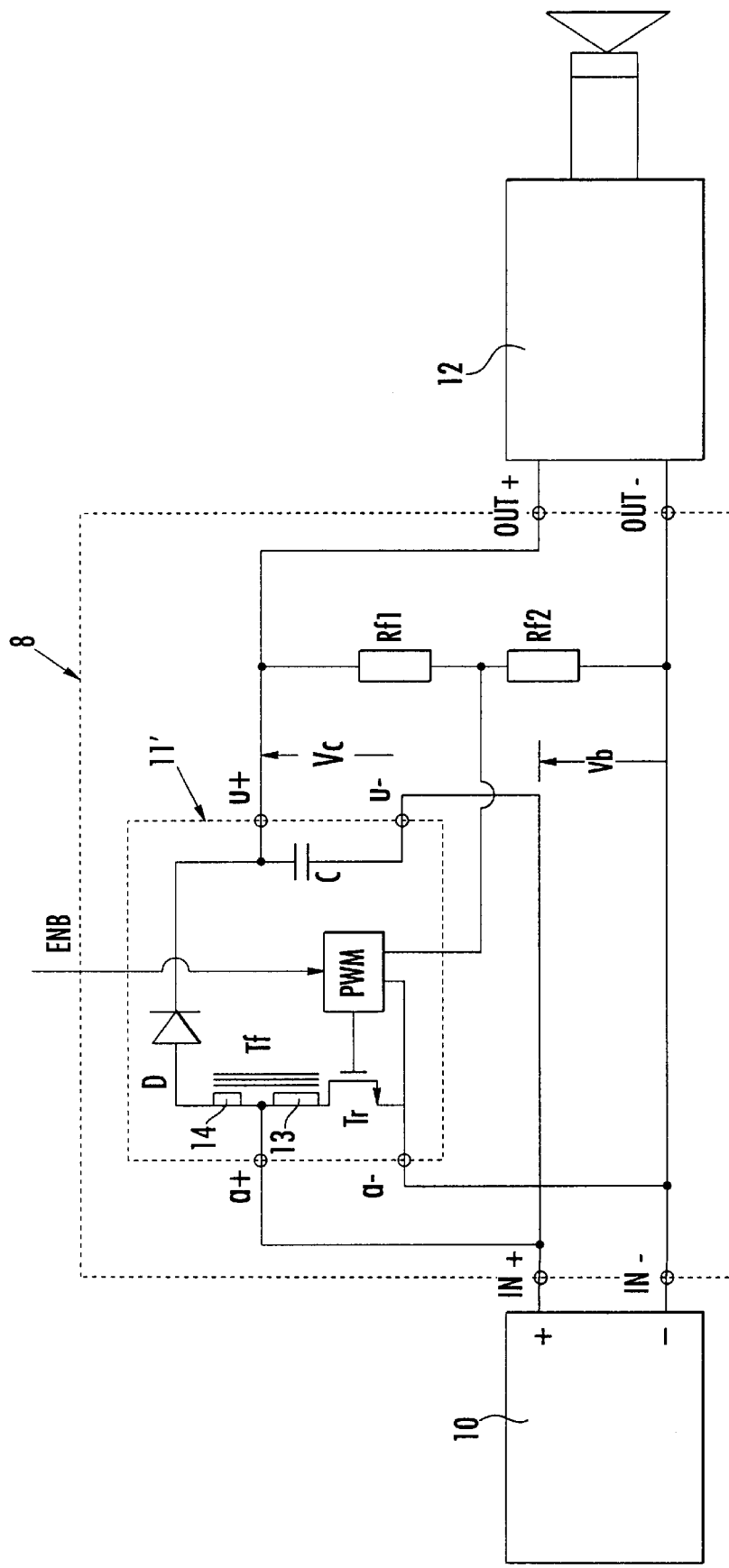
FIG. 5 is a block diagram including further details of the circuit of the system in FIG. 3.

A practical example of embodiment of the DC/DC converter, of a known type, for the amplifier system in FIG. 3 is shown schematically in FIG. 5. A controlled electronic gate, in this case a MOSFET transistor Tr, has the source electrode connected to the input terminal a− and the drain electrode connected through the primary 13 of a transformer Tf to the input terminal a+ of the converter. The transistor Tr is controlled on its gate electrode by a commutating control circuit 15, for example, a pulse-width modulator PWM which includes an adjuster (not shown) connected to the intermediate terminal of the voltage divider Rf1, Rf2. The secondary 14 of the transformer Tf is connected between the input terminal a+ and the anode of a diode D, whose cathode is connected to the output terminal u+ of the converter. A capacitor C is connected between the output terminals of the converter.

The control circuit 15 generates an impulse signal, which alternately causes the closing and opening of the electronic gate, i.e. the conduction and the locking of the transistor Tr. This causes the formation of an alternating current on the secondary of the transformer Tf whose frequency and peak amplitude depend on the frequency and on the duty-cycle of the control pulse signal. The diode D and the capacitor C respectively rectify and level the alternating current, so that at the output of the converter there is continuous current Vc. The feedback supplied by the voltage divider Rf1 and Rf2 to the control circuit 15 stabilizes the output. A signal on the ENB terminal acts on the control circuit 15 in order to impede the transistor Tr from being activated. In these conditions the audio amplifier 12 is fed only by the power Vb of the battery reduced by the fall in power on the direct diode (approx. 0.7 V). It is thus possible to choose whether to use the amplifier at maximum power or at reduced power, as necessary.

Figure 6:
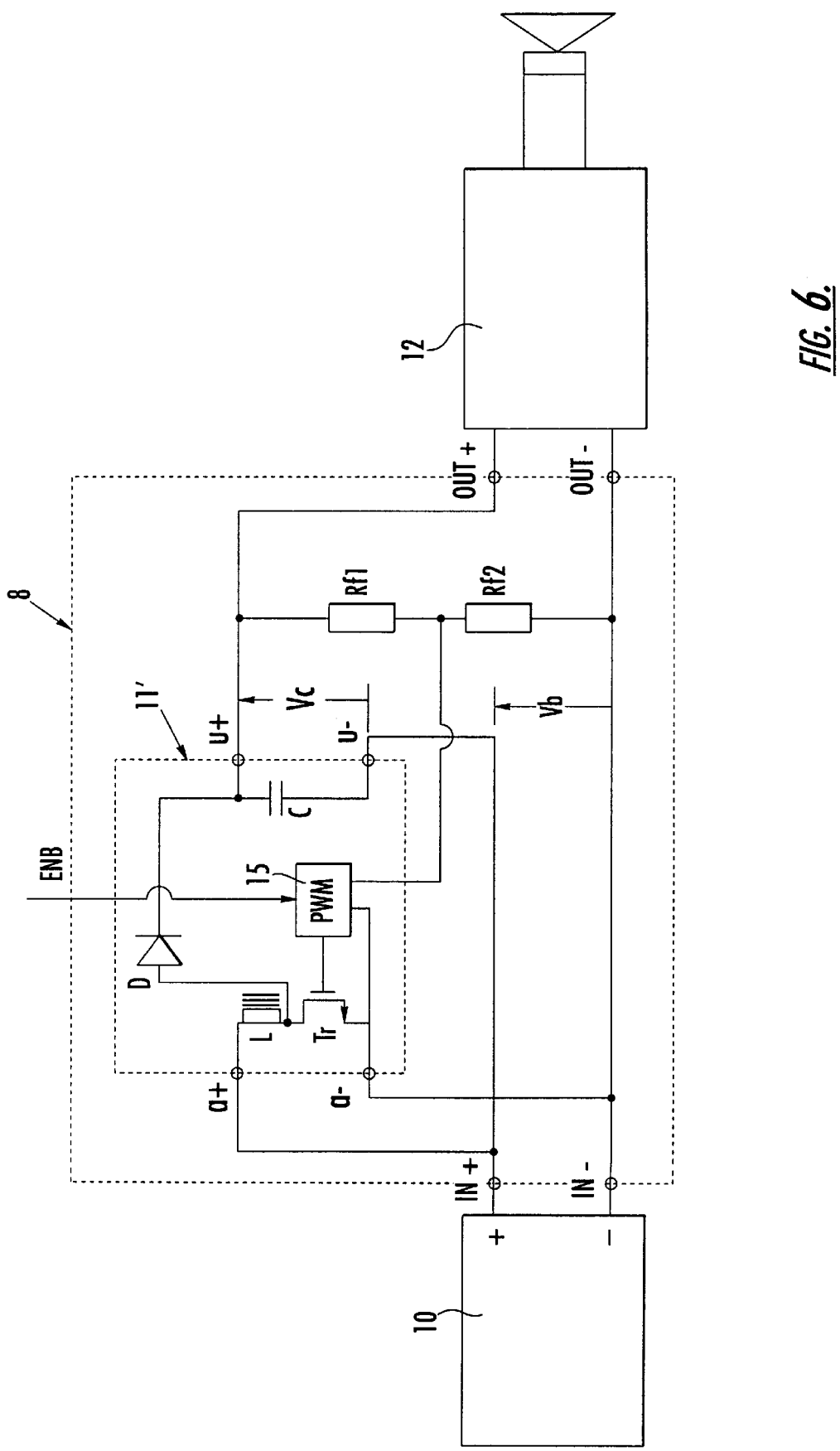
FIG. 6 is a diagram, which shows a variation of the voltage step-up circuit according to the invention.

According to another embodiment of the invention, an autotransformer with only one winding and an intermediate gate can be used instead of the transformer Tf. According to a further embodiment of the invention, shown in FIG. 6, an inductor L can be used instead of a transformer Tf with transformation ratio 1:1, connecting the anode of the diode directly to the drain electrode of the transistor Tr. This results in a further simplification of the circuit structure and a further saving in costs.

Finally, it must be noted that, due to the lower power in the converter, radiancy caused by the commutation of the electronic gate is considerably reduced using the step-up circuit according to the invention.

That which is claimed is:

1. A method of increasing a direct current input for a device powered by a battery, the method comprising the steps of:

providing a step-up circuit having first and second input terminals, first and second output terminals, and a DC/DC converter having first and second converter input terminals connected respectively to the first and second input terminals of the step-up circuit, and having a first and second output terminals, the second output terminal of the step-up circuit being connected to the second input terminal of the step-up circuit;

connecting the first and second input terminals of the step-up circuit to the battery;

connecting the first and second output terminals of the step-up circuit to the device;

connecting the first and second output terminals of the DC/DC converter to the device;

connecting the second output terminal of the DC/DC converter to the first input terminal of the step-up circuit; and connecting the first output terminal of the DC/DC converter to the first output terminal of the step-up circuit.

2. A method according to claim 1 wherein an output of the step-up circuit is the sum of an input of the step-up circuit and of an output of the DC/DC converter.

3. A method according to claim 1 wherein the DC/DC converter comprises a step-down converter.

4. A method according to claim 1, wherein the DC/DC converter further comprises an ENB terminal and a switch for connecting the first input terminal of the step-up circuit to the first output terminal of the step-up circuit in response to a signal on the ENB terminal to deactivate the DC/DC converter.

5. A method according to claim 1, wherein the DC/DC converter further comprises:

a controlled electronic gate;

a control circuit for the electronic gate;

a transformer having first and second windings;

a diode; and a capacitor;

the electronic gate being connected to the first winding of the transformer between the first and second input terminals of the DC/DC converter, the second winding of the transformer being connected to the diode between the first input terminal of the DC/DC converter and the first output terminal of the DC/DC converter, and the capacitor being connected between the first and second output terminals of the DC/DC converter.

6. A method according to claim 5, wherein the transformer comprises an autotransformer and the first and second windings define a single winding.

7. A method according to claim 5, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the second winding of the transformer and the diode define the switch.

8. A method according to claim 1, wherein the DC/DC converter further comprises:

a controlled electronic gate;

a control circuit for the electronic gate;

an inductor;

a diode; and a capacitor;

the electronic gate being connected with the inductor between the first and second input terminals of the DC/DC converter, the diode being connected between the connection of the electronic gate with the inductor and the first output terminal of the DC/DC converter, and the capacitor being connected between the first and second output terminals of the DC/DC converter.

9. A method according to claim 8, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the inductor and the diode define the switch.

10. A direct current step-up circuit for a battery-powered device comprising:

first and second input terminals for connection to a battery;

first and second output terminals for connection to the device; and a DC/DC converter having first and second converter input terminals connected respectively to the first and second input terminals of the step-up circuit, and having a first and second output terminals;

the second output terminal of the step-up circuit is connected to the second input terminal of the step-up circuit, the second output terminal of the DC/DC converter is connected to the first input terminal of the step-up circuit, and the first output terminal of the DC/DC converter is connected to the first output terminal on the step-up circuit, whereby an output of the step-up circuit is the sum of an input of the step-up circuit and of an output of the DC/DC converter.

11. A circuit according to claim 10, wherein the DC/DC converter comprises a step-down converter.

12. A circuit according to claim 10, wherein the DC/DC converter further comprises an ENB terminal and connecting means for connecting the first input terminal of the step-up circuit to the first output terminal of the step-up circuit in response to a signal on the ENB terminal to deactivate the DC/DC converter.

13. A circuit according to claim 10, wherein the DC/DC converter further comprises:

a controlled electronic gate;

a control circuit for the electronic gate;

a transformer having first and second windings;

a diode; and a capacitor;

the electronic gate being connected serially to the first winding of the transformer between the first and second input terminals of the DC/DC converter, the second winding of the transformer being connected serially to the diode between the first input terminal of the DC/DC converter and the first output terminal of the DC/DC converter, and the capacitor being connected between the first and second output terminals of the DC/DC converter.

14. A circuit according to claim 13, wherein the transformer comprises an autotransformer and the first and second windings define single winding.

15. A circuit according to claim 13, wherein the DC/DC converter further comprises an ENB terminal and connecting means for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the second winding of the transformer and the diode define the connecting means.

16. A circuit according to claim 10, wherein the DC/DC converter further comprises:

a controlled electronic gate;

a control circuit for the electronic gate;

an inductor;

a diode; and a capacitor;

the electronic gate being connected serially with the inductor between the first and second input terminals of the DC/DC converter, the diode being connected between the connection of the electronic gate with the inductor and the first output terminal of the DC/DC converter, and the capacitor being connected between the first and second output terminals of the DC/DC converter.

17. A circuit according to claim 16, wherein the DC/DC converter further comprises an ENB terminal and connecting means for connecting the first input terminal of the step-up circuit to she first output terminal of the step-up circuit in response to a signal on the ENB terminal to deactivate the DC/DC converter; wherein the ENB terminal is connected to the control circuit of the electronic gate; and wherein the inductor and the diode define the connecting means.

18. A direct current step-up circuit for a device powered by a battery, the circuit comprising:

first and second input terminals for connection to the battery;

first and second output terminals for connection to the device, the second output terminal being connected to the second input terminal; and a DC/DC converter having first and second converter input terminals connected respectively to the first and second input terminals of the step-up circuit, and having a first and second output terminals, the second output terminal of the DC/DC converter being connected to the first input terminal of the step-up circuit, and the first output terminal of the DC/DC converter being connected to the first output terminal on the step-up circuit.

19. A circuit according to claim 18 wherein an output of the step-up circuit is the sum of an input of the step-up circuit and of an output of the DC/DC converter.

20. A circuit according to claim 18, wherein the DC/DC converter comprises a step-down converter.

21. A circuit according to claim 18, wherein the DC/DC converter further comprises an ENB terminal and a switch for connecting the first input terminal of the step-up circuit to the first output terminal of the step-up circuit in response to a signal on the ENB terminal to deactivate the DC/DC converter.

22. A circuit according to claim 18, wherein the DC/DC converter further comprises:

a controlled electronic gate;

a control circuit for the electronic gate;

a transformer having first and second windings;

a diode; and a capacitor;

the electronic gate being connected to the first winding of the transformer between the first and second input terminals of the DC/DC converter, the second winding of the transformer being connected to the diode between the first input terminal of the DC/DC converter and the first output terminal of the DC/DC converter, and the capacitor being connected between the first and second output terminals of the DC/DC converter.

23. A circuit according to claim 22, wherein the transformer comprises an autotransformer and the first and second windings define a single winding.

24. A circuit according to claim 22, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the second winding of the transformer and the diode define the switch.

25. A circuit according to claim 18, wherein the DC/DC converter further comprises:
 a controlled electronic gate;
 a control circuit for the electronic gate;
 an inductor;
 a diode; and
 a capacitor;
 the electronic gate being connected with the inductor between the first and second input terminals of the DC/DC converter, the diode being connected between the connection of the electronic gate with the inductor and the first output terminal of the DC/DC converter, and the capacitor being connected between the first and second output terminals of the DC/DC converter.

26. A circuit according to claim 25, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the inductor and the diode define the switch.

27. A audio device powered by a battery, the device comprising:
 a speaker;
 an amplifier connected to the speaker; and
 a direct current step-up circuit for connection between the battery and the amplifier, the circuit including
  first and second input terminals for connection to the battery,
  first and second output terminals for connection to the amplifier, the second output terminal being connected to the second input terminal, and
  a DC/DC converter having first and second converter input terminals connected respectively to the first and second input terminals of the step-up circuit, and having a first and second output terminals, the second output terminal of the DC/DC converter being connected to the first input terminal of the step-up circuit, and the first output terminal of the DC/DC converter being connected to the first output terminal on the step-up circuit.

28. An audio device according to claim 27 wherein an output of the step-up circuit is the sum of an input of the step-up circuit and or an output of the DC/DC converter.

29. An audio device according to claim 27, wherein the DC/DC converter comprises a step-down converter.

30. An audio device according to claim 27, wherein the DC/DC converter further comprises an ENB terminal and a switch for connecting the first input terminal of the step-up circuit to the first output terminal of the step-up circuit in response to a signal on the ENB terminal to deactivate the DC/DC converter.

31. An audio device according to claim 27, wherein the DC/DC converter further comprises:
 a controlled electronic gate;
 a control circuit for the electronic gate;
 a transformer having first and second windings;
 a diode; and
 a capacitor;
 the electronic gate being connected to the first winding of the transformer between the first and second input terminals of the DC/DC converter, the second winding of the transformer being connected to the diode between the first input terminal of the DC/DC converter and the first output terminal of the DC/DC converter, and the capacitor being connected between the first and second output terminals of the DC/DC converter.

32. An audio device according to claim 31, wherein the transformer comprises an autotransformer and the first and second windings define a single winding.

33. An audio device according to claim 31, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the second winding of the transformer and the diode define the switch.

34. An audio device according to claim 27, wherein the DC/DC converter further comprises:
 a controlled electronic gate;
 a control circuit for the electronic gate;
 an inductor;
 a diode; and
 a capacitor;
 the electronic gate being connected with the inductor between the first and second input terminals of the DC/DC converter, the diode being connected between the connection of the electronic gate with the inductor and the first output terminal of the DC/DC converter, and the capacitor being connected between the first and second output terminals of the DC/DC converter.

35. An audio device according to claim 34, wherein the DC/DC converter further comprises an ENB terminal and a switch for connecting the first input terminal of the step-up circuit to the first output terminal of the step-up circuit in response to a signal on the ENB terminal to deactivate the DC/DC converter; wherein the ENB terminal is connected to the control circuit of the electronic gate; and wherein the inductor and the diode define the switch.

* * * * *

UNITED STATES PATENT AND TRADEMARK OFFICE
CERTIFICATE OF CORRECTION

PATENT NO. : 6,307,357 B1
DATED : October 23, 2001
INVENTOR(S) : Edoardo Botti and Fabrizio Cassani It is certified that error appears in the above-identified patent and that said Letters Patent is hereby corrected as shown below:

Title page,
Item [73], delete "STMicroelectronics S.R.L." insert -- STMicroelectronics S.r.l. --
Item [30], delete "April 19,1999 (IT) ………………….. MI99A0257" insert
-- Feb. 10, 1999 (IT) ……………………………… MI99A0257 --

Column 1,
Line 67, delete "circuit step-up circuit having" insert -- circuit having --

Column 2,
Line 49, delete "out+of" insert -- out+ of --

Column 6,
Line 22, delete "to she first" insert -- to the first --

Signed and Sealed this

Ninth Day of July, 2002

Attest:

JAMES E. ROGAN
*Attesting Officer*        *Director of the United States Patent and Trademark Office*